United States Patent [19]

Mickleson et al.

[11] 4,445,209
[45] Apr. 24, 1984

[54] DITHERED FOCUSING SYSTEMS

[75] Inventors: Lee Mickleson; Eric V. Olson, both of Long Beach, Calif.

[73] Assignee: Discovision Associates, Costa Mesa, Calif.

[21] Appl. No.: 339,800

[22] Filed: Jan. 15, 1982

Related U.S. Application Data

[63] Continuation of Ser. No. 70,063, Aug. 27, 1979, abandoned.

[51] Int. Cl.³ .............................................. G11B 7/00
[52] U.S. Cl. ...................................... 369/45; 250/201
[58] Field of Search .................... 369/45; 250/201; 350/355; 310/335; 358/342

[56] References Cited

U.S. PATENT DOCUMENTS

| | | | |
|---|---|---|---|
| 3,168,659 | 2/1965 | Bayre | 310/335 |
| 3,876,875 | 4/1975 | Velzel | 369/45 |
| 3,932,700 | 1/1976 | Snopko | 369/44 |
| 3,952,191 | 4/1976 | Linet | 369/45 |
| 3,985,952 | 10/1976 | Adler | 369/44 |
| 4,032,776 | 6/1977 | Rosmalen | 369/45 |
| 4,037,929 | 7/1977 | Bricot | 369/45 |
| 4,044,273 | 8/1977 | Hands | 310/335 |
| 4,124,273 | 11/1978 | Huignard | 369/45 |

*Primary Examiner*—Alan Faber
*Attorney, Agent, or Firm*—Ronald J. Clark

[57] ABSTRACT

A servo control system for maintaining an information detection device, such as a light beam, at the optimum focused position above an information track for retrieving the maximum amount of reflected radiation from an information track, such as a spiral recording track on a videodisc. The system of the invention includes an optical system, a piezoelectric dither element, a dither oscillator, circuitry for deriving an intermediate signal indicative of the effect of the dither on the detected signal derived from the information track, phase comparison circuitry for deriving an error signal from a comparison of the dither signal applied to the piezoelectric dither element and the actual dither modulation of the light beam retrieved from the information track, and a movable lens assembly responsive to the error signal for accurately focusing the light beam upon an information track.

12 Claims, 6 Drawing Figures

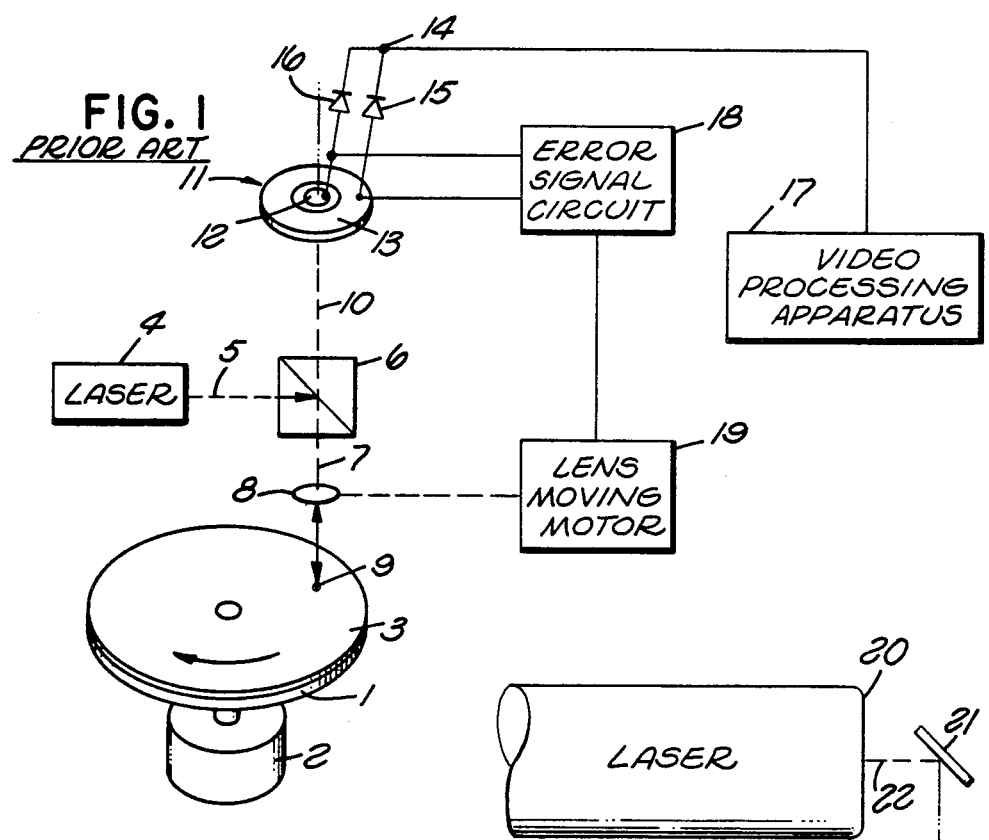
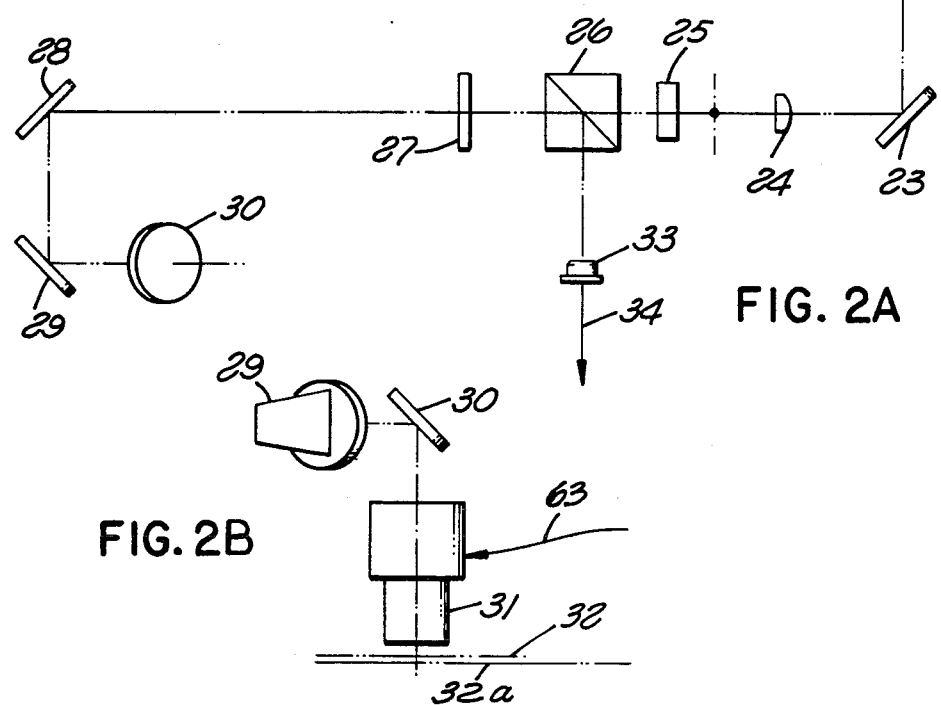

DITHERED FOCUSING SYSTEMS

This is a continuation of application Ser. No. 70,063, filed Aug. 27, 1979, now abandoned.

BACKGROUND OF THE INVENTION

1. Field of the Invention

This invention relates generally to systems for the reproduction of recorded information, such as video information recorded on a disc, and, more particularly, to systems for focusing a light beam on an information track on such a disc.

Video and other types of information can be stored on a disc as a succession of light reflective and non-reflective regions along a spiral information track on the surface of disc-shaped record carrier. In reproducing the video information, a video disc player employs an optical system for directing a radiant reading beam, such as a laser beam, onto the information track, and for detecting a reflected beam indicative of the reflectivity of the disc surface scanned by the laser beam as the disc is rotated. In a disc player of the type with which the invention may be employed the intensity of the reflected beam takes the form of a high frequency carrier signal which is frequency modulated by the video information.

In many prior art video disc players, the light beam is focused on a micron wide information track of the video disc. Such a focus often requires a focusing capability of a light spot of less than one micron in width. Slight variations in the distance between the objective lens and the video disc information track can cause a loss of information in the reflected beam at the detection plane. Further undesirable frequencies in the resulting electrical signal can be encountered.

Video discs are subject to surface imperfections which vary the distance between the objective lens focusing the impinging light beam and the information track. Video discs made of plastic, for example, may have varying thicknesses which are unavoidable even in the most sophisticated of replication processes. In disc manufacturing, further, ripple patterns may develop and vertical eccentricities can result from mass manufacturing techniques. Warping from distribution, storage and manufacturing may vary the lens-to-surface distance, especially at the outer edges of the disc where the variations occur at a more rapid rate.

Such variations, if known beforehand, can be accommodated by several techniques. The light source, for example, can be manipulated to re-establish focus. The beam intermediate the light source and the objective lens also can be manipulated. The objective lens itself may be moved toward and away from the video disc along the path of the light. Such movement of the objective lens, however, requires precision apparatus sensing very miniscule spatial movements of the video disc. The lens servo apparatus, moreover, must be capable of determining the correct direction along the reflected light beam axis to insure correct sport focusing on the disc.

2. Description of the Prior Art

Various systems for focusing have been known in the past. Such a system can be seen in the application of James E. Elliott and Lee Mickelson, Ser. No. 909,860, filed May 26, 1978, and now U.S. Pat. No. 4,152,586, issued May 1, 1979, and assigned to the assignee of the present invention which is a continuation-in-part of Ser. No. 803,986, filed June 6, 1977, now abandoned.

The reflected light beam of this system is focused by the objective or focusing lens to a point beyond the lens. Detectors are positioned beyond the focused reflected light beam. A first detector is circular in shape, having its center along the axis of the reflected beam. A concentric second detector has a circular central annulus adapted to surround the first detector while being spaced slightly therefrom. The size of the first detector and of the opening of the second detector is such that approximately equal light intensity is received by each detector when the beam is in optimum focus. The detectors transduce the received light into the electrical signals which are used to activate a servo-system as well as to detect the information on the disc.

This system utilizes focus error signals and tracking error signals at approximately the same frequencies. Therefore, the focus servo system which must be sensitive at the frequencies of the focus errors is also sensitive at the tracking error frequencies. Thus track crossings, track eccentricities, or any other tracking anomalies appear as focus errors.

Accordingly, there has been a need for an improved and more reliable technique of focusing which avoids the use of multiple detectors and lower frequency servo-systems. The present invention is directed principally to this end.

SUMMARY OF THE INVENTION

The present invention resides in apparatus and a corresponding method for its use, for correcting the focus position of a detection means, such as a beam used to read information from a recording track, whereby the focus position is dithered longitudinally along the axis of the reading beam. Basically as it applies to a video disc player, the apparatus of invention includes a piezoelectric dither member, means for generating an oscillatory dither signal, means for phase comparison of a reflectivity signal derived from the reflected light beam and the oscillatory dither signal for providing a known error signal, and lens focusing means responsive to this known error signal for maintaining the read beam at the optimum focus position above the information track for retrieving the maximum amount of reflected radiation from the information track.

In accordance with the best mode of the invention as presently contemplated, the piezoelectric dither member is responsive to the electrical field applied to it and the motion of the piezoelectric dither member is directly proportional to the intensity of the electrical field directed to it.

It will be appreciated from the foregoing that the present invention represents a significant advance in the field of video reproduction systems as well as in data retrieval systems in general. In particular, the invention provides a simplified and more reliable technique for ensuring that the beam used to read video information accurately maintains the optimum focused position on the information track. Other aspects and advantages of the present invention will become apparent from the following more detailed description, taken in conjunction with the accompanying drawings.

BRIEF DESCRIPTION OF THE DRAWINGS

FIG. 1 is a simplified diagrammatical view of an optical system for a video disc player according to the prior art;

FIG. 2a is a simplified diagrammatical view of an optical system according to the present invention;

FIG. 2b shows a side view of a portion of the optical playback system shown in FIG. 2a;

DETAILED DESCRIPTION OF THE PREFERRED EMBODIMENT

Figure 3:
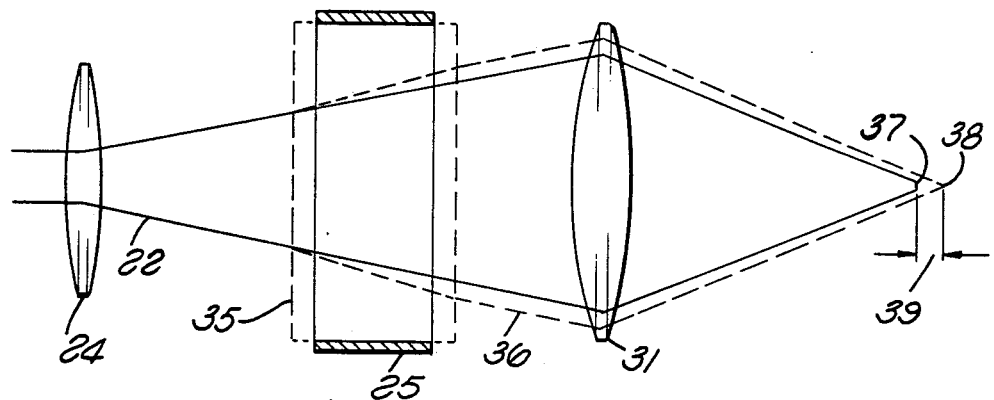
FIG. 3 is a schematic view of the application of the dither signal by means of a piezoelectric element.

FIG. 1 illustrates a prior art video disc player which includes a turntable 1, rotated by a motor 2 and carrying a video disc 3, whose surface is programmed at high density to represent information such as pictures and sound. The recorded information is arranged on the surface of the video disc 3 in circular or spiral tracks which normally have a discreet width. A track width of somewhat less than one micron is not unusual.

A light beam of coherent light from a light source such as a laser 4, is directed to a beam splitter 7, having a reflective surface therein. The reflecting surface directs the beam represented schematically by its axis centerline 5, through an objective lens 8.

The objective lens 8 is selected for its capability of focusing the light beam 7 on to a spot 9 on the video disc 3. In the prior art the spot 9, when properly focused, was never larger in diameter than the width of the information track. Thus the light beam must be focused to a spot having a precise diameter. The light beam is reflected by the video disc 3, which returns the beam through the objective lens 8 and through the beam splitter 6 that passes the reflected light beam along a path represented by the centerline 10 of its axis.

It may readily be appreciated that the distance between the objective lens 8 and the surface of the disc 3 at the spot 9 is critical. Should the distance vary, the precise focusing of the beam at the spot 9 is then lost. The light beam then covers a wider area of the video disc 3, introducing the possibility of cross talk in the reflected beam from adjacent information tracks and a decreased signal-to-the-noise ratio in the reflected beam. As explained above, slight warpage, disc eccentricity, plastic thickness variation or ripple patterns can cause such loss of focus and consequential loss of resolution and frequency response in the system.

A detector 11 receives the beam 10 and provides an electrical signal output responsive thereto. The detector 11 having two separate elements 12 and 13, respectively. The elements are electrically insulated one from the other. An electric lead is taken from each of the elements 12 and 13 and summed at a node 14, having appropriate rectifying means 15 and 16. The summed signal is directed to a video processing apparatus 17. The video processing apparatus may comprise a cathode ray display that the signals representing the modulated light beam can be processed through a visual type television display. The video processing apparatus and display alternatives are well known to those skilled in the art, and no further details will be given.

The signals from the transducer detector 11 are separately fed to an error signal circuit 18. The error signal circuit 18 produces an output signal capable of driving a lens moving motor 19. The lens moving motor 19 is connected to translate the objective lens 8 along the axis 7 of the light beam.

FIG. 2 illustrates a schematic representation of the preferred embodiment of the present invention.

A laser 20 provides a coherent beam of light 20' which is directed to the information surface 32a of a video disc 32. The reading beam 20' is manipulated by a series of plane mirrors 21 and 23. The plane mirrors 21 and 23 direct the read beam 22' to pass through a diverging lens 24. The diverging lens 24 acts to enlarge the area of the reading beam 22'. The beam 22', then passes to a piezoelectric dither element 25. The piezoelectric dither element 25, provides a dither signal to the read beam 22'. The application of the dither signal to the piezoelectric element 25 and subsequently to the read beam 22' will be discussed in detail with reference to a subsequent figure. The beam 22', then passes through beam splitter 26. The beam splitter 26 is polarization sensitive, allowing only one polarization of light to pass through the beam splitter 26. The read beam 22' then passes to a quarterwave plate 27, which rotates the polarization of the reading beam 22' by 45 degrees. The reorientation of the polarization of the reading beam 22' eliminates interference between the reading beam 22' and a reflected beam 22' from the video disc. The quarterwave plate 27, further provides that the reflected beam 22' is reflected from the beam splitter 26 to a photodetector 33. The beam 22' then passes from the quarterwave plate 27, to a third plane mirror 28, which directs the read beam 22' to impinge upon a fourth plane mirror 29. The beam 22' then passes to a fifth plane mirror 30, which directs the beam 22' to an objective lens 31. The objective lens 31 is a movable optical element which manipulates the beam 22' to follow the excursions of the video disc 32 to maintain proper focus in response to control signals generated by a focus servo not shown in FIG. 2. Further, the objective lens 31 images the beam 22' upon the information surface of the video disc 32a. The video disc 32, is provided with a reflective layer which reflects the reading beam 22' and forms the reflected beam 22'. The reflected beam 22' retraces the path of the read beam 20' back to the beam splitter 26, where the reflected beam 22' is directed to the photodetector 33. The photodetector 33 is a photoelectric transducer from which an output signal is transmitted to a focus servo over a line 34.

Referring now to FIG. 3 which shows a simplified diagrammatical view of the piezoelectric dither element 25 and a portion of the optical system. The light beam 22' enters the diverging lens 24 where the light beam 22' is expanded. The expanded light beam passes to the piezoelectric dither element 25 where the dither signal is applied to the light beam 22'.

The undeformed piezoelectric dither element indicated at 25 has no specific effect on the light beam 22'. However, when deformed as indicated by the dotted line 35 the object distance, or the imaging point is changed due to the change in thickness and the subsequent variation in the refractive index of the piezoelectric dither element 25. The change in object distance is proportional to the change in thickness of the piezoelectric dither element 25. The dotted line 36 indicates the modified light beam. The light beam 22' passes through the objective lens 31 where it is then imaged at the imaging point 37 on the information surface of a video disc. The imaging point 38 is the modified light beam's point of impingement upon the information surface of the video disc. The difference between the imaging point 37 and the modified imaging point 38 is indicated by the line 39.

Figure 4:
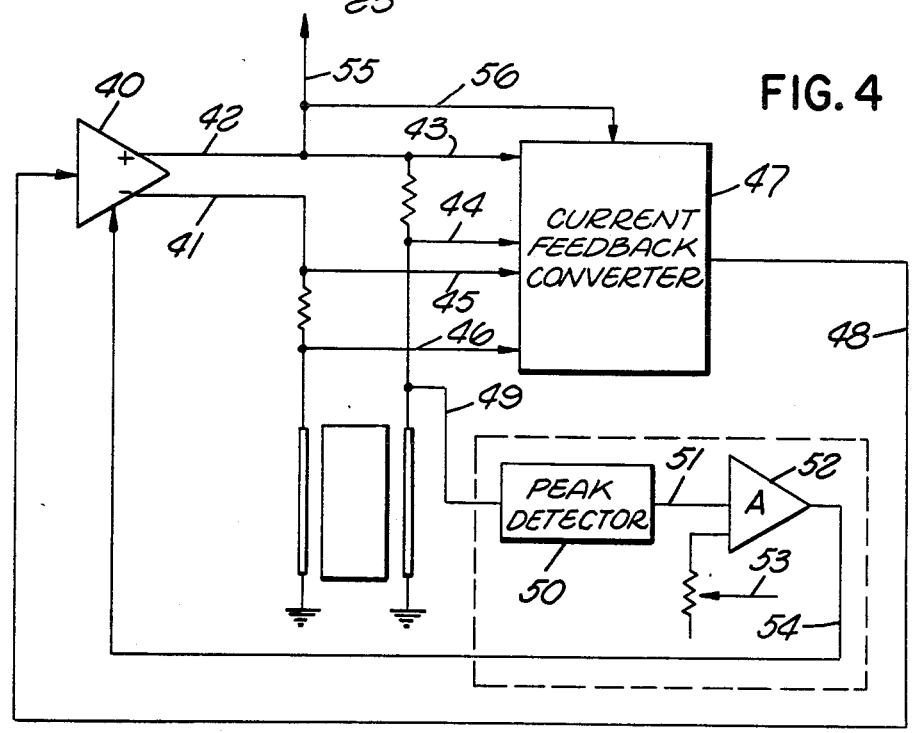
FIG. 4 is a block diagram of an oscillatory dither signal generator.

FIG. 4 is a schematic representation of the dither signal generator.

An amplifier 40, provides a sine wave output on the lines 41 and 42. The outputs 41 and 42 are the dither drive signals provided to the piezoelectric dither element 25.

The current provided to the piezoelectric dither element 25, shown in FIG. 3, is further directed to a current feedback converter 47 along the lines 43, 44, 45 and 46. The current feedback converter 47, generates a voltage proportional to the current passing through the piezoelectric dither element 25. The voltage generated in the current feedback converter 47 is then applied to the amplifier 40 along the line 48. This system provides a feedback signal to the amplifier 40 for maintaining the oscillations of the piezoelectric dither element 25 at the desired frequency.

Further, a line 49 provides the dither signal which is applied to the piezoelectric dither element 25 to a peak detector 50. The peak detector 50 measures the amplitude of the dither signal, which is then applied over the line 51 to an amplifier 52. The amplifier 52 has a second input from a potentiometer 53 which provides an adjustable output 54 of the amplifier 52. The adjustable output 54 is then directed to the amplifier 40.

This circuitry provides precise control of the dither amplitude. Such precise control of the dither amplitude further provides accurate control of the amplitude of the dither signal applied to the read beam 22. This precision is required due to the minute size of the actual information stored on the information storage medium.

The line 55 provides the dither signal to the focus servo for phase comparison, which will be discussed in detail in a later figure.

Figure 5:
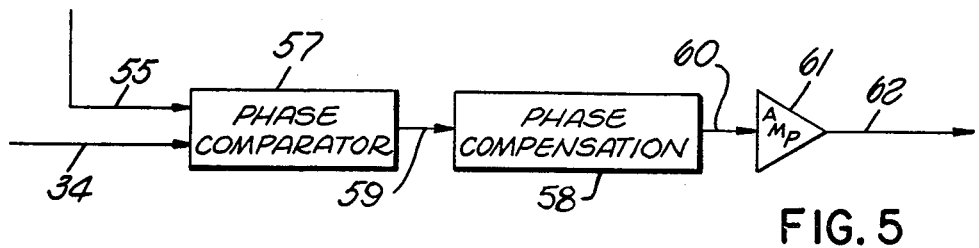
FIG. 5 is a block diagram of a focus servo.

FIG. 5 shows a schematic representation of the focus servo.

The dither signal on the line 55 and the information retrieved from the video disc 32 on the line 56 are applied to a phase comparator 57. The phase comparator 57 compares the actual dither signal applied to the piezoelectric dither element 25 and the retrieved dither signal from the video disc 32.

The phase and amplitude errors determined by the phase comparator 57 indicates the direction and amount of the actual focus error.

The focus error signal is then directed to a phase compensation network 58 along a line 59. The phase compensation network 58 corrects for unwanted phase shifts which might occur in the dither focusing system. The phase corrected signal is then transmitted along a line 60 to an amplifier 61. A lens driver control signal is generated in the amplifier 61 and directed along a line 62 to the objective lens 31 along a line 63.

The lens driver control signal provides impulses to the objective lens 31, which represent the direction and amount of the focus correction required to maintain the reading beam 22 aligned longitudinally along the axis of the read beam 22, for retrieving the maximum amount of reflected radiation from the information track.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for retrieving information stored in a plurality of optically readable information tracks formed in an information storage medium by an information recovery system, comprising:

a radiation source for generation of a coherent beam of radiation;

beam shaping means for directing the said beam of radiation to impinge upon the said information track in a reading beam spot;

read detecting means for deriving an information signal from an information track;

focusing means for indicating a vertical misalignment of the reading beam spot with respect to the information storage medium and for supplying a corresponding control signal indicative of the misalignment;

transducer means for moving the reading spot longitudinally along the axis of the said coherent beam of radiation;

means for generating an oscillatory dither signal for application to said transducer means; and lens focusing means separate from said transducer means and responsive to the said control signal for maintaining the said beam of radiation at the optimum focused position above the information track for retrieving the maximum amount of reflected radiation from the information track;

and wherein:

the said transducer means is responsive to the said oscillatory dither signal, and includes a piezoelectric member having conductive contacts, positioned upon at least two opposing surfaces of said member, said piezoelectric member functions as an optical element through which the coherent beam of radiation passes, the said piezoelectric member is physically deformed in proportion to the electrical field intensity applied to the said member, and the reading beam spot is removed longitudinally along the axis of the coherent beam of radiation as a direct result of the deformation of the said member and at a frequency determined by the said oscillatory dither signal.

2. An apparatus as claimed in claim 1, wherein the said focusing means includes:

means for deriving an intermediate signal for generating the said control signal.

3. An apparatus as claimed in claim 2, wherein the same means for deriving an intermediate signal is responsive to the oscillatory dither signal and comprises:

means for phase comparison of the said information signal derived from the said read detecting means and the oscillatory dither signal for providing a known focus error signal to the said control signal for maintaining the said beam of radiation at the optimum focused position above the information track for retrieving the maximum amount of reflected radiation from the information track.

4. An apparatus for use with a video disc player arranged to recover optically readable information stored in a record shaped disc, the said information stored in a pluralty of information tracks, the said apparatus comprising:

a radiation source for generation of a coherent beam of radiation;

beam shaping means for directing the said beam of radiation to impinge upon the said disc in a reading beam spot;

read detecting means for deriving an information signal from the said information track;

focus means for indicating a vertical misalignment of the reading spot with the information track and for supplying a corresponding control signal indicative of the misalignment;

transducer means for moving the reading beam spot longitudinally along the axis of the coherent beam of radiation;

means for generating an oscillatory dither signal for application to the said transducer means; and lens focusing means separate from said transducer means and responsive to the said control signal for maintaining the said beam of radiation at the optimum focus position above the information track for retrieving the maximum amount of reflected radiation from the information track;

and wherein:

the said transducer means is responsive to the said oscillatory dither signal and includes a piezoelectric member having conductive contacts, at least two per surface, positioned upon at least two opposing surfaces of said member, and said piezoelectric member functions as an optical element through which the coherent beam of radiation passes, the said piezoelectric member is physically deformed in proportion to the electical field intensity applied to said member, and the reading beam spot is moved longitudinally along the axis of the said coherent beam of radiation as a direct result of the deformation of said member and at a frequency determined by the said oscillator dither signal.

5. An apparatus as claimed in claim 4, wherein the said focus means includes:

means for deriving an intermediate signal for generating the said control signal.

6. An apparatus as claimed in claim 5, wherein the said means for deriving an intermediate signal is responsive to the oscillatory dither signal and comprises:

means for phase comparison of the said information signal derived from the said read detecting means and the oscillatory dither signal for providing a known focus error signal to the said control signal means for maintaining the said beam of radiation at the optimum focused position above the information track for retrieving the maximum amount of reflected radiation from the information track.

7. A method for retrieving information stored in a plurality of optically readable information tracks formed in an information storage medium by an information recovery system, comprising the steps of:

imaging a beam of radiation in a reading beam spot upon the said information track;

deriving an information signal from said information track;

generating a control signal indicative of vertical misalignment between the said information storage medium and the reading beam spot;

generating an oscillator dither signal for moving the beam of radiation longitudinally along the axis of the said beam of radiation; and manipulating the said beam of radiation responsive to the said control signal for maintaining the beam of radiation at the optimum focused position above the information track for retrieving the maximum amount of reflected radiation from the information track;

and wherein the said step of generating an oscillatory dither signal for moving the beam of radiation includes passing the beam of radiation through a piezoelectric member serving both as an optical element and as a deformable transducer, deforming the piezoelectric member proportionally to an electrical field intensity, and directing the said beam of radiation to move the reading beam spot longitudinally along the axis of the said beam of radiation at a frequency determined by the said oscillatory dither signal.

8. The method as claimed in claim 7, wherein the said step of generating the said control signal includes:

deriving an intermediate signal for generating the said control signal.

9. The method as claimed in claim 7, wherein the said step of deriving an intermediate signal includes:

comparing the phases of the said information signal and the said oscillatory dither signal to provide a known focus error signal to the said control signal and to maintaining said beam of radiation at the optimum focused position above the information track, for retrieving the maximum amount of reflected radiation from the information track.

10. A method for retrieving information stored in a plurality of optically readable information tracks formed in a record-shaped disc by an information recovery system, in particular, a video disc player, comprising the steps of:

imaging a beam of radiation in a reading beam spot upon the said disc;

deriving an information signal from an information track;

generating a control signal indicative of a vertical misalignment between the said disc and the reading beam spot;

generating an oscillatory dither signal for moving the beam of radiation longitudinally along the axis of the said beam of radiation at the optimum focused position above the information track for retrieving the maximum amount of reflective radiation from the information track;

and wherein the said step of generating an oscillatory dither signal for moving the beam of radiation includes passing the beam of radiation through a piezoelectric member serving both as an optical element and as a deformable transducer, deforming the piezoelectric member proportional to an electrical field intensity, and directing the said beam of radiation to move the reading beam spot longitudinally along the axis of the said beam of radiation at a frequency determined by the said oscillatory dither signal.

11. The method as claimed in claim 10, wherein the said step of generating the said control signal includes:

deriving an intermediate signal for generating the said control signal.

12. The method as claimed in claim 11, wherein the said step of deriving an intermediate signal includes:

comparing the phases of the said information signal and the oscillatory dither signal to provide a known focus error signal to the said control signal and to maintain the said beam of radiation at the optimum focused position above the information track, for retrieving the maximum amount of reflection radiation from the information track.

* * * * *